United States Patent
Schlick

(10) Patent No.: US 11,890,912 B2
(45) Date of Patent: Feb. 6, 2024

(54) VALVE BLOCK WITH FILLING CONNECTION

(71) Applicant: RAPA Automotive GmbH & Co. KG, Selb (DE)

(72) Inventor: Matthias Schlick, Selb (DE)

(73) Assignee: RAPA Automotive GmbH & Co. KG, Selb (DE)

( * ) Notice: Subject to any disclaimer, the term of this patent is extended or adjusted under 35 U.S.C. 154(b) by 275 days.

(21) Appl. No.: 16/740,942

(22) Filed: Jan. 13, 2020

(65) Prior Publication Data

US 2020/0238783 A1   Jul. 30, 2020

(30) Foreign Application Priority Data

Jan. 24, 2019   (DE) .................... 10 2019 101 791.2

(51) Int. Cl.
*B60G 17/052* (2006.01)
*F16K 27/00* (2006.01)
*F16K 11/00* (2006.01)
*F16K 11/20* (2006.01)

(52) U.S. Cl.
CPC .......... *B60G 17/0528* (2013.01); *F16K 11/00* (2013.01); *F16K 11/20* (2013.01); *F16K 27/00* (2013.01); *F16K 27/003* (2013.01)

(58) Field of Classification Search
CPC ............ B60G 17/0528; B60G 17/0523; B60G 2400/51222; F16K 27/003; F16K 27/102
See application file for complete search history.

(56) References Cited

U.S. PATENT DOCUMENTS

| 3,285,298 A * | 11/1966 | Gellman | F23Q 2/52 251/339 |
| 5,413,230 A * | 5/1995 | Folter | A23L 2/54 251/339 |
| 6,199,838 B1 * | 3/2001 | Cotter | F16F 9/0218 267/64.28 |
| 7,959,173 B1 * | 6/2011 | Morroney | F15B 13/06 280/124.157 |
| 2005/0000568 A1 * | 1/2005 | Nikolayev | F16L 37/23 137/231 |

(Continued)

FOREIGN PATENT DOCUMENTS

| CN | 1864025 A | 11/2006 |
| DE | 14 30 557 A | 4/1969 |

(Continued)

OTHER PUBLICATIONS

Examination Report dated Nov. 19, 2019 in corresponding German application No. 10 2019 101 791.2; 9 pages.

(Continued)

*Primary Examiner* — Reinaldo Sanchez-Medina

(74) *Attorney, Agent, or Firm* — Maier & Maier, PLLC

(57) ABSTRACT

A valve block for an air suspension system for a vehicle, including a pressure supply connection and at least one load connection it is to be achieved that a pre-assembly of an air suspension valve block can be avoided without having to utilize an air dryer on a granulate basis during the filling of the air suspension system. This means that a subsequent (Continued)

filling of a completely assembled air suspension system is possible. This is achieved by a filling connection with integrated filling valve.

14 Claims, 6 Drawing Sheets

(56) References Cited

U.S. PATENT DOCUMENTS

| | | | |
|---|---|---|---|
| 2006/0118173 A1* | 6/2006 | Yamamoto | B60C 29/062 137/223 |
| 2007/0277886 A1* | 12/2007 | Morris | B60G 17/0523 137/596.15 |
| 2008/0224428 A1* | 9/2008 | Smith | B60G 17/0185 280/5.514 |
| 2010/0072412 A1 | 3/2010 | Frank et al. | |
| 2011/0101257 A1* | 5/2011 | Morris | B60G 17/0525 251/129.01 |
| 2012/0080099 A1* | 4/2012 | Wang | B60S 5/043 137/223 |
| 2012/0097282 A1* | 4/2012 | Coombs | F15B 13/0814 137/861 |
| 2012/0138826 A1* | 6/2012 | Morris | B60C 23/00354 251/12 |
| 2014/0014197 A1* | 1/2014 | Renaker | B60C 25/18 137/231 |
| 2014/0191451 A1* | 7/2014 | Moss | F16F 9/0218 137/68.19 |
| 2016/0169423 A1 | 6/2016 | Wu | |
| 2019/0070921 A1* | 3/2019 | Meier | B60G 17/0565 |

FOREIGN PATENT DOCUMENTS

| | | |
|---|---|---|
| DE | 100 09 117 A1 | 8/2001 |
| DE | 102 37 703 A1 | 9/2003 |
| DE | 699 24 068 T2 | 4/2006 |
| DE | 10 2005 030 726 A1 | 1/2007 |
| DE | 10 2006 004 204 B3 | 9/2007 |
| DE | 10 2006 060 923 A1 | 6/2008 |
| DE | 10 2012 222 982 A1 | 6/2014 |
| DE | 10 2016 003 662 A1 | 10/2017 |
| DE | 10 2016 119 990 A1 | 4/2018 |
| DE | 10 2016 120 759 B3 | 4/2018 |
| EP | 1 878 958 A1 | 1/2008 |
| WO | 2005013393 A2 | 2/2005 |
| WO | 2009095038 A1 | 8/2009 |
| WO | 2012/078255 A2 | 6/2012 |

OTHER PUBLICATIONS

Search Report dated Mar. 20, 2020 in corresponding European Application No. 20153202.5; 13 pages including partial machine-generated English-language translation.

Office Action dated Oct. 27, 2023, in corresponding Chinese Application No. 202010085977.3, 11 pages.

* cited by examiner

VALVE BLOCK WITH FILLING CONNECTION

FIELD

The disclosure relates to a valve block, an air suspension system, and a method for manufacturing the valve block.

BACKGROUND

In vehicles with an air suspension, a counterforce to the forces on the respective wheel or the respective axle owing to dynamic vehicle behavior is produced with the aid of compressed air. The pressure in the air struts and/or air bellows of the vehicle can be adjusted, for example, via electromagnetic control valves. The chassis characteristics and/or the driving comfort can thus be adjusted in a targeted manner.

Such vehicles correspondingly comprise an air suspension system with, for example, a central valve block with control valves, regulating valves, and/or magnetic valves, to whose connections various loads are connected, such as air struts, air bellows, and possibly a compressed air tank and/or storage, and a compressor which ensures the desired system pressure and/or pressure in the loads, in particular in the compressed air tank, during operation.

For manufacturing the valve block, for example, a valve body already containing the pressure supply connections and load connections or connecting pieces and/or housings therefor is equipped with magnetic valves, usually with one magnetic valve per pressure supply connection and/or load connection. After the electrical contacting of the magnetic valves and possibly attachment of a corresponding electrical plug, the valve body, and/or the magnetic valves are cast with a casting compound, for example a two-component polyurethane casting compound. Such valve blocks are delivered to compressor manufacturers, for example, who then fit the valve blocks in the vehicle. In the final assembly of the vehicle, the air suspension system must be initially filled with compressed air. Although such air suspension systems usually have an extra compressor in the vehicle, the latter cannot be employed for the initial filling of the system, since usually also an air dryer, for example of a granulate construction type, is provided on the compressor. With the amount of air necessary for initially filling the air suspension system, this air dryer would be inadmissibly saturated with moisture and would correspondingly fail in later use, since the air drying unit is dimensioned such that it regenerates only in interaction with air suctioned in and dispensed again. The admissible leakages of the system components can be overcome thereby.

The initial filling therefore takes place with the aid of a filling station during the final assembly of the vehicle. The air suspension system is already completely installed in the vehicle—typically with the exception of the pressure supply connection or P connection on the valve block. This P connection of the valve block is connected to a filling adapter and compressed air is introduced into the system via this path. Electromagnetic directional valves to the air suspension bellows are opened, wherein the compressed air flows into the air struts and/or air bellows via this path. When the desired filling pressure has been reached, the magnetic valves to the air struts are closed again and—if present—a compressed air tank of the system is filled in the same manner. This compressed air tank is usually filled at a higher pressure level, for which reason the filling takes place separately. When the desired storage pressure has been reached, the magnetic valve to the storage is closed and the filling adapter is switched to pressureless and removed from the P connection of the valve block again. Now the pneumatic connection between the compressor and the valve block is finally fixed to the P connection of the valve block.

This approach always requires that the air suspension system be pre-assembled, filled and the last assembly steps are carried out only after the filling, such as, for example, inserting a compressed air hose in the P connection. It is not possible to finish the complete assembly of the air suspension system and fill it only thereafter.

A valve block of the type specified at the outset is known for example from DE 10 2016 120 759 B3. A multi-directional valve with magnetic valves has the shape of a valve block comprising a valve body with connections for pressure supply and to various loads (pressure storage and front and rear, right and left air struts of a vehicle). A magnetic valve for an air suspension system is shown and described, for example, in DE 10 2016 119 990 A1.

The object of the invention is to permit the filling of a completely pre-assembled air suspension system.

SUMMARY

The basic idea of the present invention is the provision of an additional filling connection on a valve block for an air suspension system. The invention is thus based on the thought of providing a separate flow path for filling the air suspension system with the aid of an external filling apparatus and of thus avoiding a subsequent assembly step of the air suspension system after the filling of the air suspension system, wherein the filling mechanics form part of the air-suspension valve block and/or its valve body. The external filling apparatus is in particular not the compressor installed in the vehicle.

Correspondingly, a valve body according to the invention provided for a valve block of a vehicle's air suspension system comprises, besides the known pressure supply connections and/or load connections and/or housings for the same, a filling connection housing for forming a filling connection. Correspondingly, the filling connection housing is formed so that a filling valve can be incorporated. The filling connection housing forms an additional opening in the valve body for the specified additional and/or separate flow path and can already have connections for a corresponding external filling apparatus. The inner side of the filling connection housing of the valve body is formed cylindrically symmetric, for example, possibly with varying inner diameters along a longitudinal axis or axis of symmetry of the filling connection housing, said diameters increasing towards the opening in particular, for example steadily, in stepwise manner and/or continuously.

A valve block according to the invention for an air suspension system for a vehicle correspondingly comprises pressure supply connections and/or load connections and a filling connection equipped with a filling valve and provided for connecting an external filling apparatus. For creating the pressure supply connections and/or load connections possibly connection adapters are incorporated, for example screwed, in the corresponding housings of the pressure supply connection and/or load connection.

Advantages of the invention are thus that both a complete assembly of the air suspension system is possible before the initial filling of the air suspension system via the filling connection according to the invention, since all lines of the air suspension system (load lines, pressure supply line) can be connected to the valve block already before the initial filling and it is not required, for example, to keep clear the P connection, and that the air suspension compressor and/or the air drying unit associated therewith does not need to be used for the filling.

Further, the risk of damaging the P connection during the initial filling is prevented. Finally, the additional filling connection according to the invention also permits a later refilling (which is presently likewise understood as an initial filling) of the air suspension system, for example within the scope of repair, without having to disassemble the air suspension system, in particular on the P connection. The present invention now permits to finish the complete assembly of the air suspension system on the assembly line and fill it with compressed air only in a subsequent step.

In an advantageous embodiment the valve body is formed as an injection-molded part, in particular as a plastic injection-molded part, such as of a thermoplastic plastic, and/or formed in single-piece manner. The filling connection and/or a housing of the filling connection is preferably integrated in the valve body and/or formed in single-piece manner with the valve body and/or firmly connected to the valve body and/or molded onto the valve body. Further, preferably also the pressure supply connections and/or load connections and/or their housings are integrated in the valve body, formed in single-piece manner with the valve body and/or firmly connected to the valve body and/or molded onto the valve body. This prevents a mechanical interface between the filling, pressure supply and/or load connections and/or their housings and the valve block and/or the valve body, thereby in turn achieving a high mechanical strength of the filling, pressure supply and/or load connections. Further, a potential leakage location between the valve block and/or valve body and the filling connection and possibly also the load connections and the pressure supply connection is prevented.

In an advantageous further development of the valve block according to the invention it is provided that the filling connection has a filling valve which is arranged in the housing of the filling connection and/or on the inside of the housing of the filling connection and which is adapted for connecting a filling apparatus, in particular an external one, wherein the filling valve can preferably be mechanically unlocked and/or actuated and/or opened by the external filling apparatus. Correspondingly, the filling mechanics in the form of the filling valve is integrated in the valve block and/or valve body, whereby the flow path through the filling connection is opened upon plugging in a filling nozzle or the like of the external filling apparatus.

Further, the filling valve is preferably configured as a completely mechanical and/or purely mechanical valve, in particular without active (actuator) components, i.e., as a passive valve, for example in contrast to control valves which are allocated to the pressure supply and/or load connections. Correspondingly—for example in comparison to known valve blocks —, no additional control is required and the valve block according to the invention can be employed instead of conventional valve blocks without requiring adaptations to surrounding components, for example a valve block control.

In a further advantageous further development of the valve block according to the invention, it is provided that the filling valve has an axially displaceable sealing piston, which closes the flow path through the filling connection in a closing position and opens the flow path through the filling connection in an opening position, wherein the filling valve is preferably adapted such that the sealing piston can be moved mechanically from the closing position into the opening position upon or by connecting an external filling apparatus and/or wherein the sealing piston is adapted to be urged into the closing position by a system pressure, i.e. the pressure on the inside of the valve block and/or the air suspension system, and/or wherein the filling valve comprises a spring component, in particular a compression spring and/or helical spring, which urges the sealing piston into the closing position. It is expedient for this purpose if the sealing piston is guided by holding components, in particular by one, two or more holding ring(s) and/or a disk and/or a spacer disk, wherein the holding components are preferably fixed directly to the housing of the filling connection and are particularly preferably formed as self-holding pressed-in parts. These integrated elements both facilitate operation and assembly and lower the manufacturing costs. The holding components of the filling connection preferably have an outer side configured in a sawtooth shape which ensures the anchoring of the holding components on the inner side and/or the inner wall of the filling connection housing. The inner side of the housing of the filling connection preferably has a diameter in the range between 5 and 50 mm. The diameter amounts to, for example, 5, 8, 10, 15, 20, 30, 40 or 50 mm, wherein each of the specified ranges can also be an upper or lower limit of the specified range. The system pressure during operation is preferably in the range between 5 and 50 bar and amounts to, for example, 5, 8, 10, 15, 20, 30, 40 or 50 bar, wherein each of the specified ranges can also be an upper or lower limit of the specified range.

The filling connection is thus mechanically unlocked by the external filling apparatus, i.e., the sealing piston of the filling valve is pushed back, thereby clearing the flow path required for the filling process. For the case of excessive filling, i.e., in the case that too much pressure is present in the air suspension system, this excess compressed air can thus also be released again through the filling connection. The receiving geometry for the filling connection, i.e., the housing of the filling connection, is preferably configured such that the individual components of the filling valve can be plugged into the opening of the filling connection housing individually and/or consecutively for assembling the filling valve. In addition, the filling connection and/or the filling valve can be configured such that it is optically recognizable whether the sealing piston is in the closed position. For example, the sealing piston or its axial outer side in the closing position of the filling valve is flush with the valve body and/or the housing of the filling connection or projects beyond the latter. With few additional components and little effort, this embodiment creates an efficient possibility of filling the air suspension system after the complete assembly of the same. Further, it is possible at any given time, also after repair or maintenance and the emptying of the system connected therewith, for example, to refill via the filling connection without disassembling connections of the valve block or dismantling the air suspension system otherwise. This embodiment additionally achieves that the system pressure in the air suspension system has a closing effect on the filling connection. An automatic locking of the connection is thus achieved after the filling process, possibly also without a compression spring and/or helical spring. The compression spring and/or helical spring is advantageous also for the definite location positioning of the piston and for supporting the closing process.

Preferably, the holding components comprise exactly one inner holding ring, one outer holding ring and one interposed spacer disk. The spacer disk (also referred to as distance ring) is preferably a plastic injection-molded part and has a disk opening. The outer surface (outer edge) of the spacer disk is arranged on an inner side and/or inner surface of the housing of the filling valve and an inner surface (inner edge) of the disk opening lies against an outer surface of the sealing piston. The spacer disk here has, for example, a supporting function for the sealing rings and/or O-rings and causes an improvement of the guidance of the sealing piston upon its axial displacement.

A particularly preferred combination of materials results when the sealing piston is executed of plastic and when the holding components are executed of plastic and/or of metal. Metal parts can be made as simple turned parts. The plastic parts can be manufactured by injection molding.

Preferably, the filling valve of the filling connection has exactly or at least one first sealing element, preferably a first O-ring, which is preferably arranged axially between the inner and the outer holding ring and/or the spacer disk and/or, in the closing position of the filling valve, is arranged radially between the sealing piston and the valve block body or valve body and rests against these, in order to seal the sealing piston with respect to the valve block body or valve body. Depending on the environmental conditions, this embodiment can already ensure a sufficient sealing of the filling valve.

The sealing is improved when a second, outer sealing element, preferably likewise an O-ring, is provided, which, in the closing position, is arranged radially on the outer surface of the sealing piston and/or in a recess of the outer holding ring and is preferably spaced apart from the first sealing element and/or O-ring by the spacer disk. The filling connection is thus very robust over its complete lifespan in view of a leakage. The inner O-ring is the primary seal sealing the system. The outer O-ring serves as protection against environmental influences. It is thus prevented that the environmental influences typically occurring in the fitting region of the valve blocks, such as dirt and saline water for example, penetrate into the filling connection. Employing two O-rings creates a very robust sealing system.

In the valve block preferably respectively one control or regulating valve, in particular a magnetic valve, is allocated to each load connection and preferably also to the pressure supply connection, wherein the magnetic valves are preferably insert-molded with a plastic injection-molding compound, particularly preferably with a two-component plastic injection-molding compound.

In a preferred embodiment the valve block is mechanically firmly connected to the compressor. For this purpose, the valve block, the compressor, and possibly the air drying unit are mounted, for example, on a common holder.

An air suspension system according to the invention comprises a valve block as described above and one or several load(s), which is/are respectively connected to a load connection of the valve block, and a compressor, which is connected, preferably mechanically firmly connected, with the pressure supply connection of the valve block, particularly preferably mounted on a common holder. As loads there are preferably provided one or several air struts and/or air bellows and/or a pressure storage. Between the compressor and the pressure supply connection, there is preferably arranged an air drying unit, preferably on a granulate basis.

A method according to the invention for manufacturing a valve block as described above comprising the steps of:
making available a valve body as described above,
equipping the valve body with magnetic valves for the pressure supply connections and load connections, preferably with exactly one magnetic valve per pressure supply connection and/or load connection, and
equipping the filling connection housing with a filling valve for forming the filling connection, wherein preferably the components of the filling valve are incorporated in the filling connection housing consecutively and/or consecutively individually, and preferably the further step of:
insert-molding at least the magnetic valves, preferably the complete unit of valve body and magnetic valves, with a plastic injection-molding compound, particularly preferably with a two-component plastic injection-molding compound.

In a method according to the invention for filling an air suspension system as described above, the filling takes place via the filling connection, in particular while bypassing the air drying unit. Thus, the compressor can be used for pressure regulation as usual, without the initial filling having a negative influence on the function of the air drying unit.

BRIEF DESCRIPTION OF THE DRAWINGS

Embodiment examples of the invention are explained in more detail with reference to the drawings, wherein advantageous developments of the invention and advantages of the same are described.

DETAILED DESCRIPTION

Figure 1:
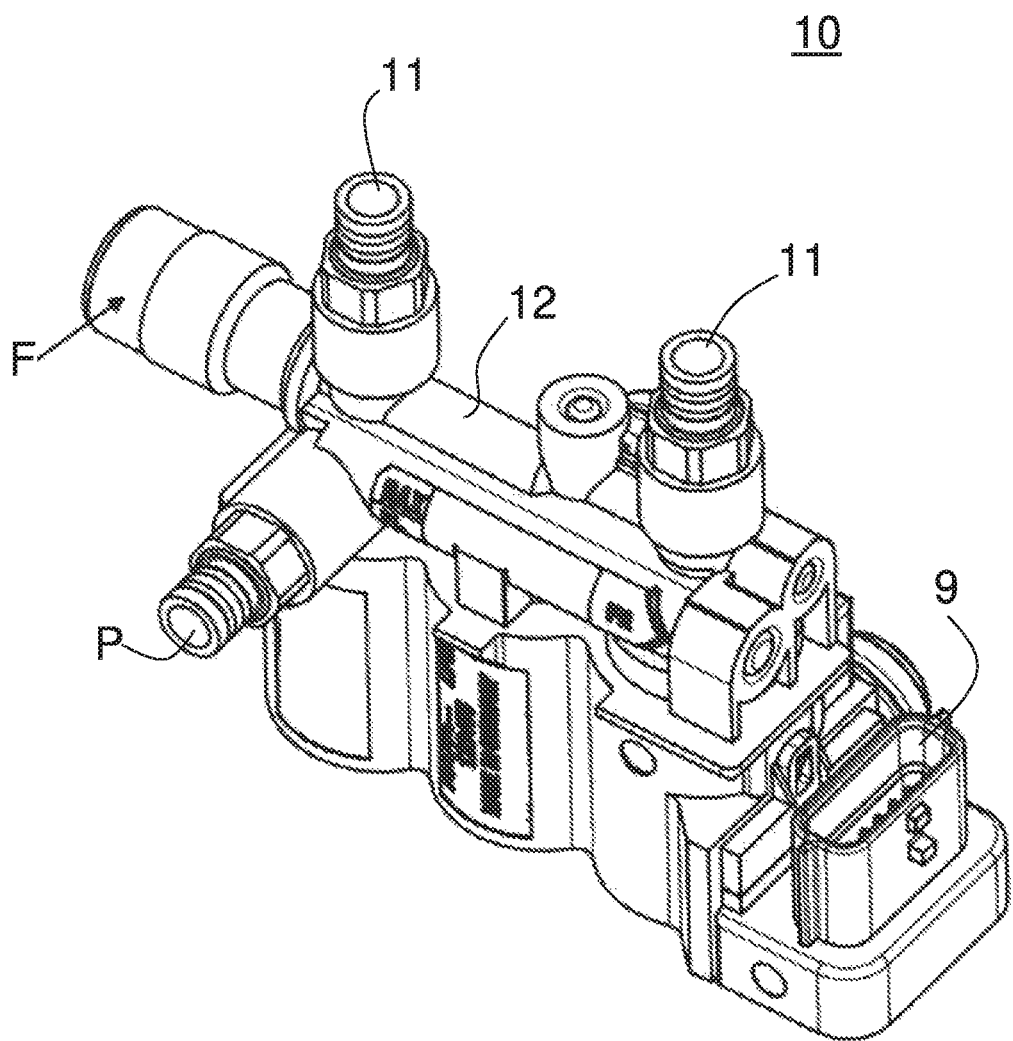
FIG. 1 is a perspective representation of an embodiment of a valve block according to the invention.
Figure 4:
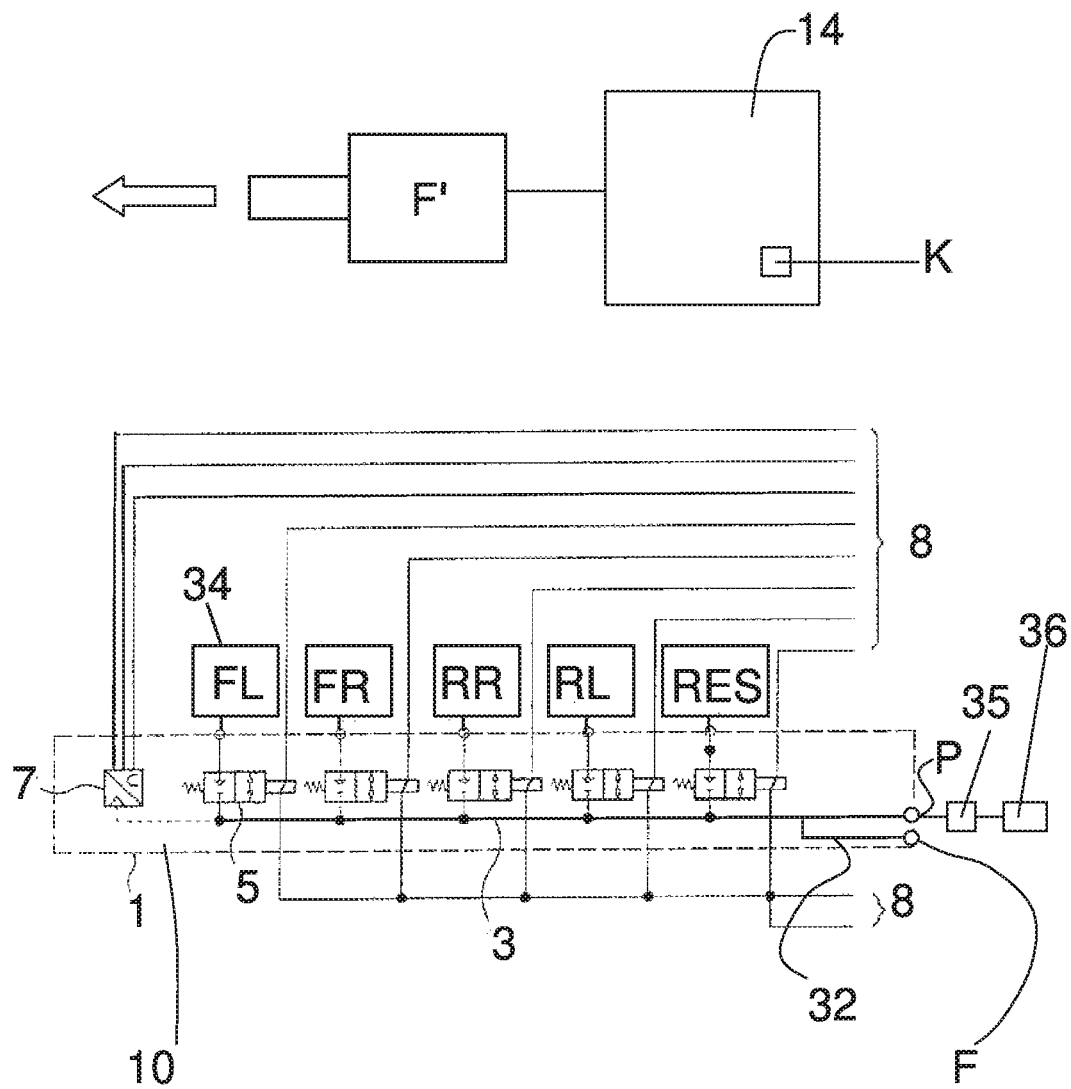
FIG. 4 is a schematic representation of an air suspension system.

FIG. 1 shows a valve block 10 according to the invention for an air suspension system for a vehicle, for example for a car or a utility vehicle, with a valve body 12. The valve block and/or its valve body 12 comprises a pressure supply connection P and several load connections 11, or RES, FL, FR, RL, RR, as also shown in FIG. 4. In the view of FIG. 1 two load connections 11 are recognizable. In a not shown embodiment, the valve block 10 comprises, besides the pressure supply connection P, five connections or load connections RES, FL, FR, RL, RR, respectively for the pressure storage RES, the left front wheel FL, the right front wheel FR, the left rear wheel RL and the right rear wheel RR.

As illustrated by FIGS. 1 and 4, the valve block 10 and/or its valve body 12 have a filling connection F in addition.

The valve block 10 and the valve body 12 are injection-molded parts in each case. As can be recognized best in FIG. 2 in connection with FIG. 1, the filling connection F is integrated in the valve body 12 and its housing 24 is formed in single-piece manner with the valve body 12. The pressure supply connection P and the load connections 11 are likewise integrated in the valve body 12, as shown by FIG. 1.

Figure 2:
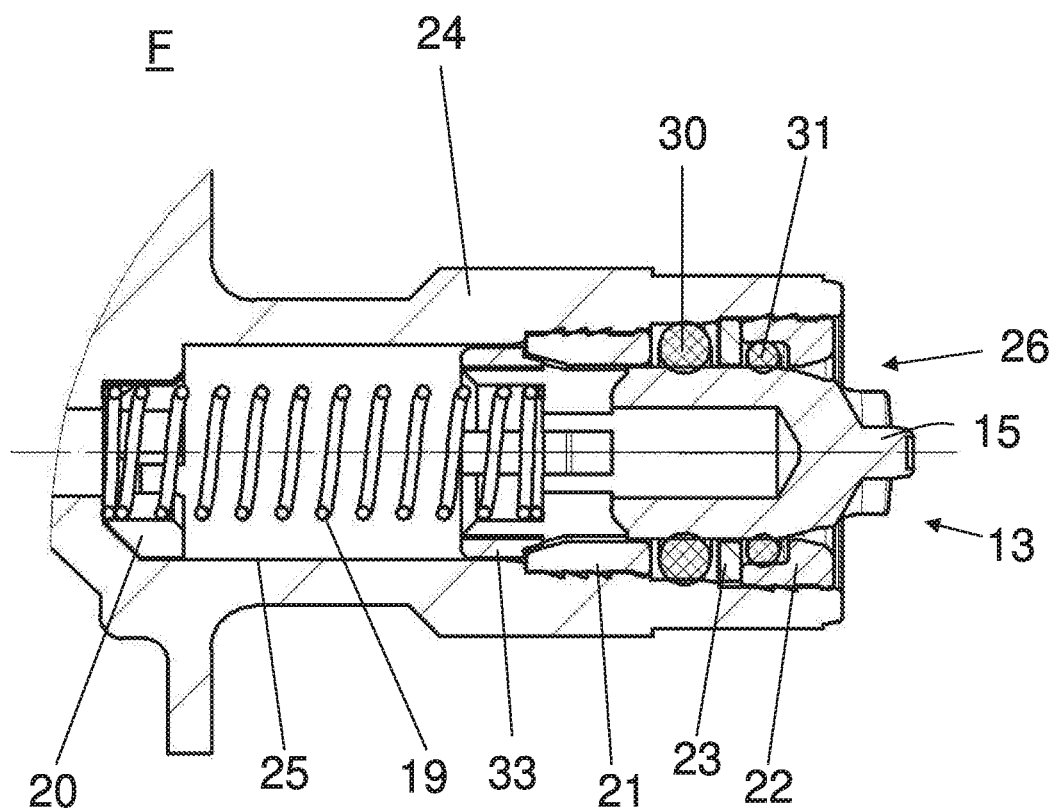
FIG. 2 is a sectional representation of the filling connection of the valve block.

FIG. 2 shows the filling connection F with the filling valve 13. The filling connection F is adapted for connecting an external filling apparatus 14 (see FIGS. 3a and 4). The filling valve 13 can be mechanically unlocked by an external filling apparatus with a filling nozzle F', by the sealing piston 15 being displaced axially between a closing position shown in FIG. 2 and an opening position. For example, an axial actuating element of the filling nozzle F', for example a pin, of the external filling apparatus 14 can push a sealing piston 15 executed of plastic of the filling valve 13 into the interior of the filling connection F. The filling nozzle F' of the external filling apparatus 14 corresponds with the filling valve 13 of the filling connection F therein.

Figure 3A:
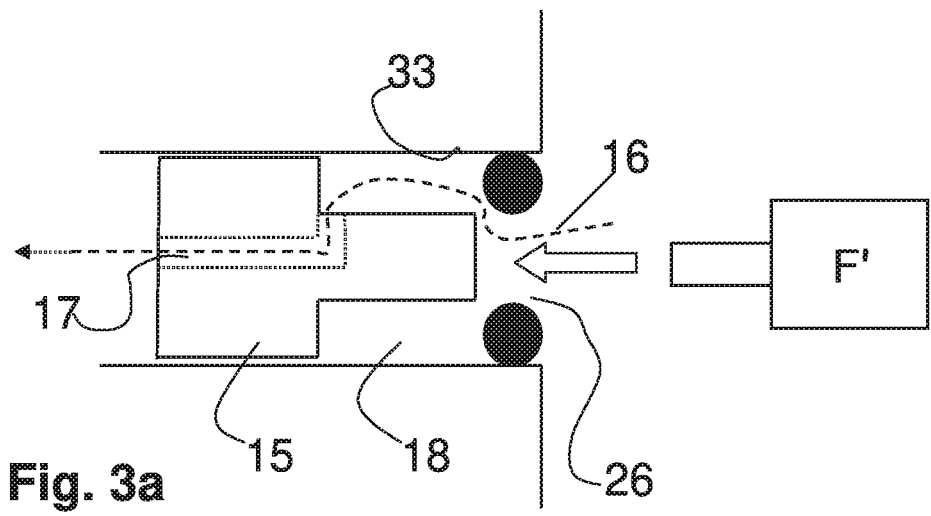
FIG. 3a is a schematic representation of the filling connection of the valve block, wherein a filling valve is opened and a flow path is indicated.
Figure 3B:
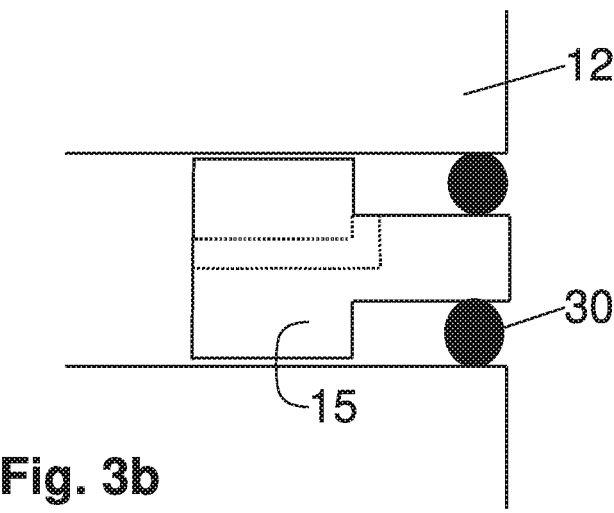
FIG. 3b is a schematic representation of the filling connection of the valve block, wherein the filling valve is closed.

FIG. 3a shows the axially displaceable sealing piston 15 and/or the filling valve 13 in the opening position. FIG. 3b shows the axially displaceable sealing piston 15 and/or the filling valve 13 in the closing position. A flow path 16 is indicated in FIG. 3a with a dashed line which, in the represented embodiment example, extends through a pass-through channel 17 in the interior of the sealing piston 15. However, the flow path 16 can also extend on the outer side of the sealing piston 15. In an opening position, shown in FIG. 3a, the flow path 16 is opened. For this purpose, the sealing piston 15 can have one or several channels 17 (indicated with dotted lines), which permit a flow through the filling connection F in the opening position. The piston 15 is displaced in a piston channel 18 during the transition between the closing position and the opening position.

The filling valve 13 is adapted such that the sealing piston 15 is moved from the closing position (FIG. 3b) into the opening position (FIG. 3a) upon connecting the external filling apparatus. The sealing piston 15 is urged into the closing position (FIG. 3b) by a system pressure present in the interior (in the drawing to the left of the piston).

In FIG. 2 it is further represented that the filling valve 13 comprises a spring component 19 in the form of a helical spring or a cylindrical compression spring 19, which is arranged between the sealing piston 15 and a spring holding ring 20. The spring component 19 urges the sealing piston 15 into the closing position (FIG. 3b), in which the sealing piston 15 is disposed in FIG. 2. In the represented embodiment, the sealing piston 15 or a widened portion 33 of the sealing piston 15 arranged on the system side abuts on an inner holding ring 21 in the closing position. The widened portion 33 and the inner holding ring 21 have mutually corresponding codification, in particular exactly one beveled surface, which center the sealing piston and thus exactly position it in the closing position.

The sealing piston 15 is thus executed such that the flow path 16 (FIG. 3a) is cleared by plugging in the filling nozzle F' (FIG. 4) of the filling apparatus 14. Thus, the loads connected at the load connections 11 (FIG. 1) or RES, FL, FR, RL, RR (FIG. 4) can be filled with compressed air when the respectively associated valves are opened. After removing the filling nozzle F' the sealing piston 15 is moved back into the closing position by the system pressure and/or the resilience of the spring component 19, so that the flow path 16 is closed again (FIG. 3b).

As further illustrated by FIG. 2, the sealing piston 15 is guided by holding components 21, 22, 23. In the represented embodiment example, an inner holding ring 21, an outer holding ring 22, and an interposed spacer disk 23 are provided as holding components. Presently, the holding rings 21, 22, are turned parts made of metal, while the disk 23 is composed of plastic. The holding components 21, 22, 23 are formed as self-holding pressed-in parts here, which can be incorporated consecutively into the valve body 12 and/or the filling connection housing 24 for assembly. Likewise, also the spring holding ring 20 is formed as a self-holding pressed-in part. The outer side of the holding components 21, 22, 23 can have a corresponding sawtooth structure for this purpose. In the represented embodiment example, the holding components 21, 22, 23 have mutually different outer diameters, in such a manner that their outer diameter increases in line with the proximity in which the holding components 21, 22, 23 are respectively provided on the filling opening 26 of the filling connection F or the filling connection housing 24. Correspondingly, also the inner side 25 of the housing 24 of the filling connection F widens in correspondingly steady manner in the direction of the filling opening 26 of the filling connection F and/or the filling connection housing 24, for example in stepwise manner, so that for each of the holding components 21, 22, 23 a corresponding inner diameter and possibly an abutment is formed on the inner side of the housing 24, whereby the end position of the pressed-in holding components 21, 22, 23 is well defined or predetermined when the filling valve is assembled. Correspondingly, the spring holding ring 20, which is provided on the system side of the holding components 21, 22, 23, has a smaller outer diameter than the holding components 21, 22, 23. Likewise, the inner side 25 of the housing 24 of the filling connection F has a smaller diameter in the fitting location provided for the spring holding ring 20 than in the fitting locations provided for the holding components 21, 22, 23. Alternatively, instead of the spring holding ring 20, a system-side abutment for the spring component 19 can be formed in the filling connection F and/or the filling connection housing 24, so that the spring holding ring 20 can be omitted.

The sealing piston 15 is disposed and moves in a piston channel 18 (FIGS. 2 and 3a), which is formed by the housing 24 of the filling connection F (valve housing). The sealing piston 15 is thus displaceably mounted directly in the valve body 12 and/or the valve block 10. Further, various components of the filling valve 13, such as the holding components 21, 22, 23 and the spring holding ring 20, are fixed directly on the housing 24 of the filling connection F and thus directly on the valve body 12 and/or the valve block 10, as shown in FIG. 2.

The holding rings 21, 22 are components arranged between the sealing piston 15 and an inner wall 25 of the housing 24 of the filling connection F, namely an inner, system-side holding ring 21 close to the compression spring or the spring component 19, and an outer holding ring 22 close to the filling opening 26 of the filling connection F (FIG. 2, FIG. 3a). Between the inner holding ring 21 and the outer holding ring 22, the spacer disk 23 is arranged, which has a disk opening in which the sealing piston 15 is received and/or against which the sealing piston rests. An outer surface of the spacer disk 23 rests against an inner surface or inner wall 25 of the housing 24 of the filling connection F and is pressed in there. An inner surface of the disk opening rests against an outer surface of the sealing piston 15 in guides the same. Further, the sealing piston 15 also rests itself or with the widened portion 33 arranged on the system side against the inner wall 25 of the housing 24 of the filling connection F and is guided thereby.

For sealing, the filling valve 13 of the filling connection F is supplied with a (first) sealing element 30, for example an O-ring, which is arranged axially between the inner holding ring 21 and the spacer disk 23 in the represented embodiment example. In the closing position (FIG. 3b) the O-ring 30 is arranged radially between the sealing piston 15 and the valve body 12 and/or the inner side 25 of the housing 24 of the filling connection F and rests against these, in order to seal the sealing piston 15 with respect to the valve body 12, as shown in FIGS. 2 and 3b.

The filling valve 13 in the represented embodiment example is supplied also with a second outer sealing element 31, here the O-ring 31, which is represented only in FIG. 2. Said ring is disposed axially on the outer side of the sealing piston 15 in the closing position and is spaced apart from the first O-ring 30 by the spacer disk 23. The outer holding ring 22 axially has at least two different inner diameters and thereby creates an L-shaped recess in the cross section or a recess arranged on the inner side of the outer holding ring 22 for receiving the second, outer sealing element 31 (O-ring 31), in order to keep away coarse dirt and other environmental influences.

In a not represented embodiment example, the second, outer sealing element is omitted and the above-described first O-ring 30 is provided as the only sealing element.

As shown in FIGS. 2 and 3b, in the represented embodiment example the sealing piston 15 is arranged flush with an outer side of the filling connection F in the closing position, which permits an optical position check. Alternatively, the sealing piston 15 can also project beyond the outer side of the filling connection F in the closing position. Further, the valve body 12 is executed as a plastic injection-molded part, for example of a thermoplastic plastic, and the housing 24 of the filling connection F is integrated in the valve block body or valve body 12 and formed in single-piece manner with the valve block body or valve body 12. The valve block 10 is likewise formed as a plastic injection-molded part, for example of a two-component casting compound. In the described embodiment, the valve block 10 is created by casting a valve body 12. However, it is also conceivable to omit the valve body 12, so that the valve block 10 is created by a single injection-molding process, in which, for example, the filling connection housing 24 is created and the magnetic valves for the pressure supply and load connections are insert molded.

FIG. 4 schematically shows an air suspension system. The loads 34, the air drying unit and the compressor 36 of the air suspension system and their electrical and pneumatic wiring can be recognized. Further, in FIG. 4 the external filling apparatus 14 with the compressor K for the initial or repeated filling via the filling connection F are represented in FIG. 4. The region surrounded by dashed lines marks the limits of the valve block 10 forming a multi-directional valve. To pneumatic connection channels 3, there are connected the pressure supply P on the one hand and five electromagnetic control valves 5 on the other hand, which in turn are connected in each case with one of the load connections FL, FR, RR, RL and RES, in order to be able to adjust a free flow cross section between the pressure supply P and the load connection in question. In the valve block 10 further a pressure sensor 7 is integrated, which is connected to the connection channel 3 via a pressure opening and measures the pressure in the connection channel 3. Electrical lines 8 from and to the magnetic valves 5 for controlling the respective electromagnetic valve actuating drives and from and to the pressure sensor 7 are guided out of the valve block 10 via a control base 9 (FIG. 1) with several corresponding electrical contacts. The filling connection F is connected here via a filling channel 32 and with the connection channel 3 and thus with the control valves 5. In the air suspension system, an air drying unit 35 on granulate basis is provided in addition between the valve block 10 and the compressor 36, which unit dries air flowing in and regenerates through air flowing out.

With the filling connection F of the valve block 10 compressed air can be introduced into the air suspension system while bypassing the air drying unit 35 and without employing the system-internal compressor 36. Electromagnetic directional valves and/or the control or regulating valves 5 to the air bellows and/or air struts are opened, wherein the compressed air flows into these loads via the former. When the desired filling pressure has been reached, the filling valve 13 and/or the control valves 5 can be closed. A pressure storage RES of the air suspension system can be filled in the same manner. The storage is usually filled at a higher pressure level. The complete filling can take place correspondingly, while the compressor 36 is already connected to the valve block 10 at the P connection, i.e., after the complete assembly of the air suspension system.

Figure 5:
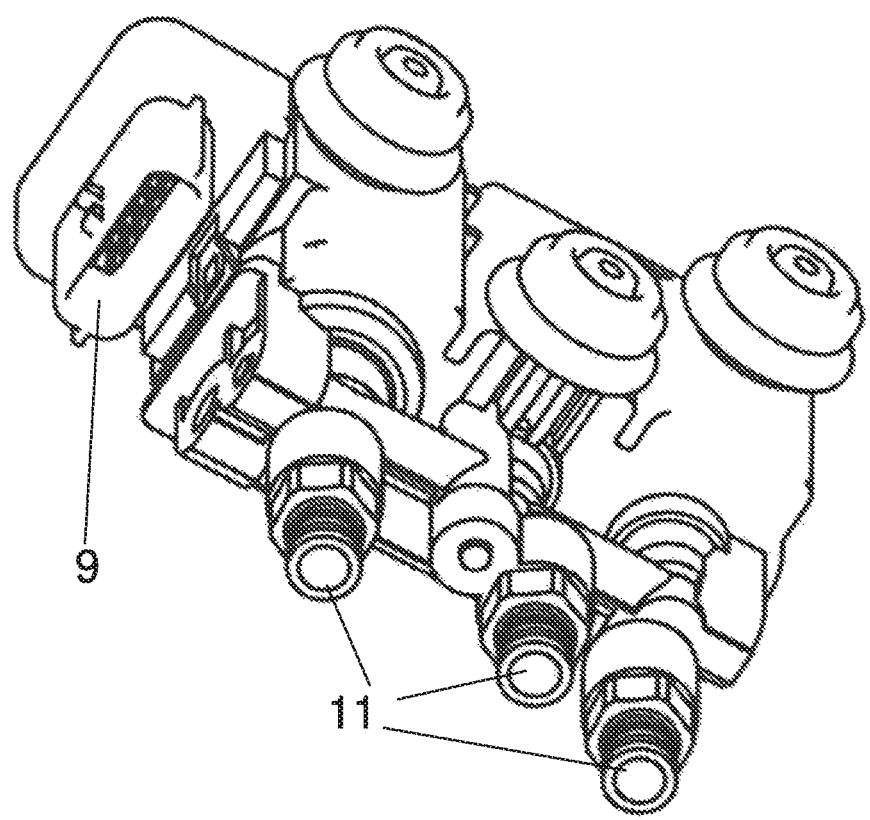
FIG. 5 is a perspective representation of a valve block according to a STATE OF THE ART.

FIG. 5 shows, analogously to FIG. 1, a valve block according to the state of the art, which does not have a filling connection F. Here, no initial filling is possible on the finished air suspension system.

Figure 6:
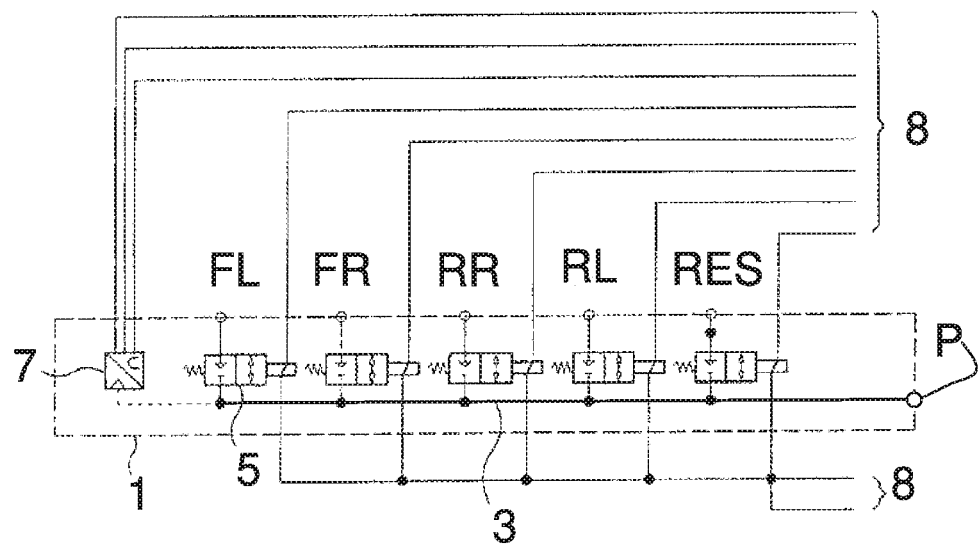
FIG. 6 is a schematic representation of an air suspension system according to a STATE OF THE ART.

FIG. 6, analogously to FIG. 4, shows a schematic representation of an air suspension system according to the state of the art, in which a valve block or a multi-directional valve 1 without filling connection is installed.

The invention is not limited to the described embodiment examples. Thus, the valve block can also have, for example, different load connections or a different magnetic valve arrangement. An embodiment without compression spring is also conceivable. An embodiment of the valve 13 as a controllable magnetic valve would be possible as well. It would also be possible to use several valve blocks in a system.

Every described feature can also be combined with every described feature, for example from the description of the state of the art, or with every shown feature of the drawings. For example, the embodiment according to FIG. 1 can have the connections according to FIG. 4.

The invention claimed is:
1. A valve body comprising:
a filling connection housing configured to form a filling connection to an external filling apparatus, wherein the filling connection is configured to selectively provide compressed air;
a pressure supply connection;
a plurality of load connections, wherein each load is configured to be filled with the compressed air from either the filling connection or the pressure supply connection; and
a sealing piston configured to be displaced axially between a closing position and an opening position, wherein a spring component, arranged between the sealing piston and a spring holding ring, is configured to urge the sealing piston into the closing position, the sealing piston is guided by holding components fixed directly on a housing of the filling connection, and the holding components are formed as self-holding pressed-in parts and have sawtooth structures on their outer sides.

2. The valve body according to claim 1, wherein the filling connection housing, the pressure supply connection, and the plurality of load connections are formed in single-piece manner with the valve body.

3. The valve body of claim 1, wherein the filling connection housing is formed so that a filling valve can be incorporated.

4. A valve block for an air suspension system for a vehicle, comprising:
- a filling connection configured to selectively provide compressed air;
- a pressure supply connection;
- a plurality of load connections, wherein each load is configured to be filled with the compressed air from either the filling connection or the pressure supply connection; and
- a sealing piston configured to be displaced axially between a closing position and an opening position, wherein a spring component, arranged between the sealing piston and a spring holding ring, is configured to urge the sealing piston into the closing position, the sealing piston is guided by holding components fixed directly on a housing of the filling connection, and the holding components are formed as self-holding pressed-in parts and have sawtooth structures on their outer sides.

5. The valve block according to claim 4, wherein the filling connection is configured to be unlocked or opened by the external filling apparatus.

6. The valve block according to claim 5, wherein the sealing piston which,
- in the closing position, is configured to close a flow path through the filling connection and,
- in the opening position, is configured to open the flow path, the sealing piston is further configured to move from the closing position into the opening position upon or by connecting the filling apparatus, and the spring component is either a compression spring or a helical spring.

7. The valve block according to claim 6, wherein the sealing piston is arranged flush with an outer side of the filling connection.

8. The valve block according to claim 4, wherein the holding components consist of an inner holding ring, an outer holding ring, and an interposed spacer disk.

9. The valve block according to claim 8, wherein the filling valve further comprises:
- at least one first sealing element, arranged axially between the inner holding ring and the interposed spacer disk.

10. The valve block according to claim 9, further comprising:
- a second outer sealing element, arranged radially between an outer surface of the sealing piston and a recess of the outer holding ring.

11. The valve block according to claim 4, further comprising:
- a magnetic valve insert molded with a two-component plastic injection-molding compound.

12. The valve block according to claim 4, wherein the valve block is mounted on a common holder.

13. The valve block of claim 4, wherein the filling connection is equipped with a filling valve.

14. An air suspension system comprising:
- a valve block according to claim 4,
- a compressor which is connected to the pressure supply connection,
- a pressure storage and/or an air drying unit arranged between the compressor and the pressure supply connection.

* * * * *